United States Patent [19]
Ushijima

[11] 3,792,514
[45] Feb. 19, 1974

[54] CUTTING TOOL
[75] Inventor: Hiroyuki Ushijima, Tokyo, Japan
[73] Assignee: Mitsubishi Kinzoku Kogyo Kabushiki Kaisha, Tokyo-to, Japan
[22] Filed: June 27, 1972
[21] Appl. No.: 266,750

[30] Foreign Application Priority Data
June 29, 1971   Japan.............................. 46-56494

[52] U.S. Cl............................................... 29/95 R
[51] Int. Cl. ............................. B26d 1/00, 29 95;96
[58] Field of Search................................29/95, 96

[56] References Cited
UNITED STATES PATENTS
3,407,467   10/1968   Wirfelt.................................. 29/95
2,713,714   7/1955   Krause.................................... 29/95

Primary Examiner—Leonidas Vlachos
Attorney, Agent, or Firm—Wenderoth, Lind & Ponack

[57] ABSTRACT

A cutting insert for a machining tool suitable for chip breaking in both heavy and light cuttings, wherein at least one projection for chip breaking in light cutting is provided in a concave groove for chip breaking in heavy cutting on a nose of the insert, said projection being isolated from an island on the insert.

5 Claims, 24 Drawing Figures

3,792,514

CUTTING TOOL

This invention relates to a cutting tool, in the form of an insert and, more particularly, it is concerned with a throw-away cutting insert of a simplified and durable structure, which is capable of breaking not only heavy chips but also light chips.

In order to attain effective chip breaking, there have heretofore been proposed various solutions. The most representative one is to provide a concave groove or grooves along the cutting blade as a chip breaker either in parallel or in slant. The concave groove assumes an arcuate or semi-circular shape in its cross-section, with which it is possible to break chips produced in relatively heavy cutting, but is difficult to break chips produced in light cutting. To overcome such shortcomings, a proposal was made to provide a plurality of concave grooves of similar cross-section in combination as mentioned in the proceeding. However, this inevitably causes widening of the concave groove with the consequence that when the breaker is adapted to a throw-away tip, the contact area between the tip and a holder therefor becomes reduced and stability of the tip becomes poor, hence such groove can only be provided on one surface of the tip in order to maintain its stability. Also, it has been proposed to further provide a small depression for chip breaking in light cutting in the nose portion of the insert. In this case, however, it is recognized that the nose portion of the insert is considered as if it had brought about crater-wear with the result that mechanical strength of the nose portion becomes lowered.

It is therefore the object of the present invention to provide a cutting insert with a chip breaker free from the afore-mentioned disadvantages.

The abovementioned object and other objects of the present invention will become more apparent from the following detailed description of the invention, when read in connection with the accompanying drawing.

In the drawing:

FIGS. 1 to 4 inclusive are respectively plan views of prior art chip breakers.

FIGS. 5 and 6 respectively show enlarged cross-sectional shapes of the concave grooves for chip breaking of the known chip breakers shown in FIGS. 1 to 3;

Figure 14:
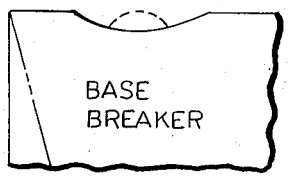
Figure 15:
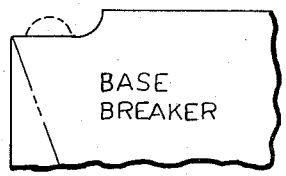
Figure 16:
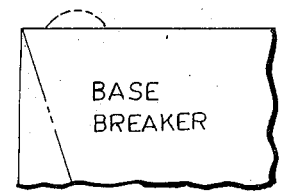
Figure 21A:
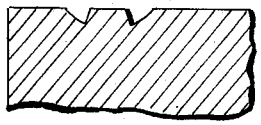
Figure 17:
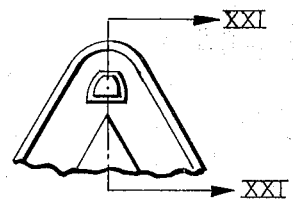
Figure 22:
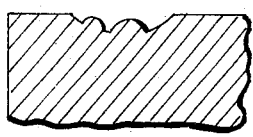
Figure 18:
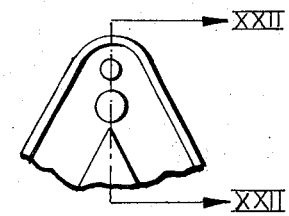
Figure 23:
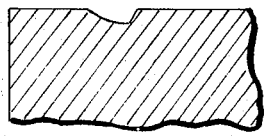
Figure 19:
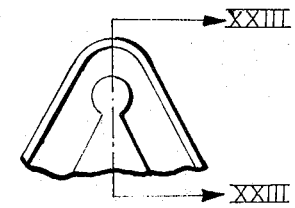
Figure 21B:
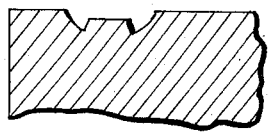
Figure 20:
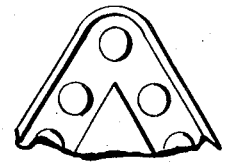

FIGS. 14 to 16 indicate respectively the shape of the base breaker;

FIGS. 17 to 20 indicate respectively modifications in the position, shape, and number of the projections to be provided on the base breaker, and FIGS. 21(a), 21(b), 22, and 23 respectively show cross-sectional shape of the projection cut along the lines XXI—XXI, XXII—XXII, and XXIII—XXIII in FIGS. 17, 18 and 19, respectively.

Figure 1:
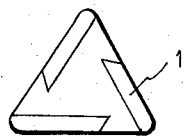
Figure 2:
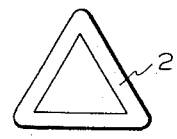

Referring now to FIGS. 1 and 2 which show a throwaway insert of the type heretofore known, a chip-breaking groove or grooves 1 or 2 are provided along the cutting edge of the insert.

Figure 3:
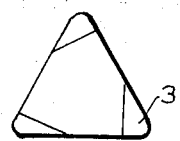

As a modification of the above, FIG. 3 indicates concave grooves 3 which are provided in three nose portions of the cutting insert.

Figure 5:
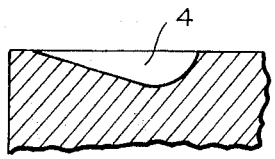
Figure 6:
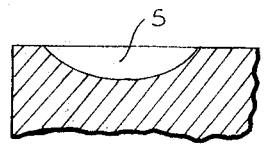

The cross-sectional shapes of these concave grooves are as shown in FIGS. 5 or 6, where they assume either a simple arcuate shape 4 (FIG. 5) or a simple semi-circular shape 5 (FIG. 6). These concaved grooves as mentioned in the foregoing paragraph are incapable of breaking chips produced in light cutting.

Figure 4:
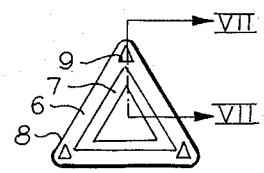
Figure 7:
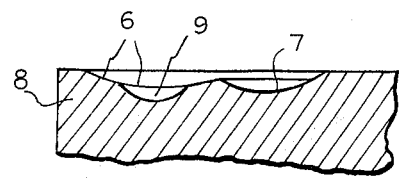
FIG. 7 is an enlarged cross-section of the double concave grooves for chip breaking cut along the line VII—VII in FIG. 4.

The prior art modification shown in FIGS. 4 and 7 is also not free from the inconvenience for the reasons as mentioned in the foregoing.

Figure 8:
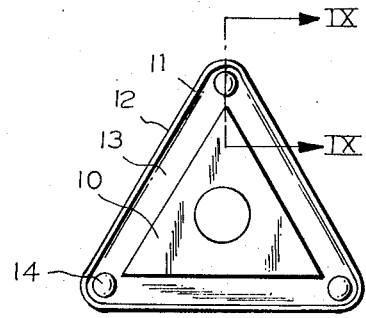
FIG. 8 is a plan view of the cutting insert according to the present invention.
Figure 9:
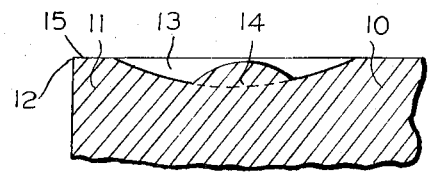
FIG. 9 is an enlarged fragmentary cross-sectional view showing the shape of the chip breaking groove cut along the line IX—IX in FIG. 8.
Figure 10:
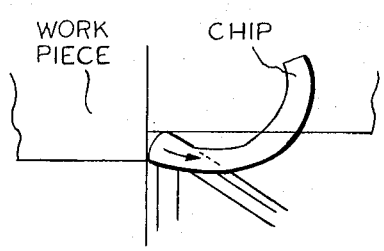
FIGS. 10 and 11 show a state of cutting a metal work piece with a cutting insert of small nose, and flowing direction of the metal chip.
Figure 12:
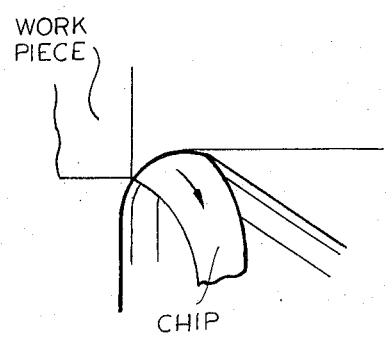
FIGS. 12 and 13 show another state of cutting a metal work piece with a cutting insert of large nose, and flowing direction of the metal chip.
Figure 11:
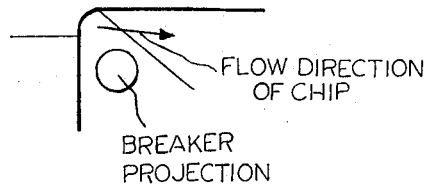
Figure 13:
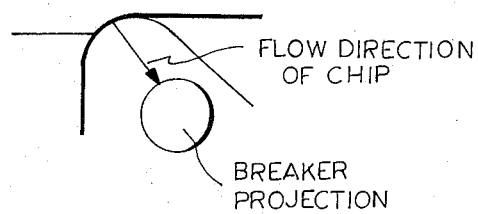

The present invention, in an attempt to solve such problems as have been encountered in the known chip breakers, has accomplished an improved structure of the chip breaking means as shown in FIGS. 8 and 9, wherein it is applied to a triangular throw-away cutting insert.

In FIGS. 8 and 9 which embodies the present invention as applied to the throw-away insert, the body thereof comprises a central island 10, noses 11, cutting edges 12 intersecting the nose 11, a chip-breaking groove 13 forming a base chip breaker for heavy cutting which is provided alongside and adjacent to the cutting edges 12. This structure is identical with the known chip-breaker shown in FIG. 2.

The main point or characteristic according to the present invention resides in that a small projection 14 for breaking chips produced in light cutting is provided in the concave groove 13 for breaking chips produced during the heavy cutting at a position near the nose 11. As shown in the figure, the projection 14 is isolated from the breaker or island 10.

In general, the thickness of chips is governed by the side cutting angle when the feed rate is constant. However, even devices having the same side cutting angle produces chips of varied thickness due to a difference in the radius of the nose. The principal difficulty in chip breaking occurs when the depth of cut is small. In other words, when comparing two devices having respective nose radii of 0.4R and 1.6R, the thickness of chips is thinner with the 1.6R nose than with the 0.4R nose, even if the same side cutting angle is used, in both instances with the consequence that chips have a greater tendency to flow in the direction away from a workpiece, i.e., the direction of the tool, with the 1.6R nose than with the 0.4R nose. For example, when a workpiece is cut with a tool having a 1.6R nose at a side cutting blade angle of 0 degrees and at a depth of cut of 1 mm, the actual side cutting angle of the side cutting blade is approximately 45 degrees.

The present invention, is to facilitate chip breaking in the light cutting operation by providing the projection 14 as an auxiliary breaker on the nose and at the bottom part of the groove for heavy cutting suth that the projection interferes for heavy cutting so as to cause this projection to interfere with the chip flowing direction.

By constructing the cutting insert according to the present invention, chips produced in light cutting can be satisfactorily broken by this projection 14, while chips from heavy cutting which are not breakable by the projection 14 can be generally broken by the concave groove 13.

Accordingly, the present invention is not only capable of satisfactorily breaking chips under a wider range of cutting conditions than achieved by the heretofore known cutting inserts, but also the breaking of chips produced in light cutting is done by the projection 14, whereby the mechanical strength at the nose 11 does not decrease, and, moreover, the width of the concave groove 13 needs not be widened. These features make it possible to incorporate this projection on both surfaces of the throwaway insert, and contributes to a simple and yet durable structure, and various other effects in both heavy or light cutting.

In the following, the results of comparative experiments between the insert according to the present invention and prior art inserts are presented.

First, the chip breaker of the present invention was manufactured with the width of the land 15 for the cutting edge 12 being 0.2 mm, the width of the concave groove 13 including the land being 2.3 mm, and depth of the groove being 0.2 mm. At the nose portion of the concave groove 13, there was further provided a projection 14 of 0.18 mm in height, the projection of which is taken as a part of an imaginary sphere having an 8 mm diameter.

Next, the conventional chip breaker was manufactured to exactly the same dimensions as mentioned above without however, the projection 14.

These two chip breakers were used to cut a workpiece of an alloy steel, SNCM-8 having a hardness ($H_B$) of 220, at a cutting speed of 120 m/min. During the cutting operation, the depth of cut and the feed rate were varied to examine breakage conditions of the chips.

In the case of the 1 mm cutting depth, it was found out that chip breaking took place at a feed rate of 0.1 mm/rev., while, the conventional chip breaker could not attain chip breaking at a feed rate of 0.25 mm/rev. or below.

Further, in the case of a 3 mm cutting depth, the conventional chip breaker could not perform chip breaking at a feed rate of 0.2 mm or below, while the present device could attain chip breaking at a feed rate of as low as 0.15 mm/rev.

In the case of a 6 mm cutting depth, the results were not much different in both conventional and inventive chip breakers, although, even then, the present chip breaker was found to have achieved better results.

The foregoing explanation has been made with respect to the embodiment shown in FIGS. 8 and 9. However, the invention can be practiced in several other ways as shown in FIGS. 14 to 23 with advantages. In the embodiments shown in FIG. 17, the projection is in the form of a frustrum and in the embodiment shown in FIG. 18 two similar projections of different dimensions are provided on the nose part.

What is claimed is:

1. In a cutting insert for a machining tool, which comprises a body having a top face having an island centrally located thereon, said body having at least one nose and two cutting edges adjoining said nose, and a base chip breaker extending along each of said cutting edges and forming a continuous concave groove in said top face of said cutting insert, the improvement comprising
a projection located on said nose and situated within the extent of said concave groove for use as an auxiliary chip breaker, said projection being isolated from said island so as to leave part of said concave groove between said projection and said island.

2. The cutting insert improvement as claimed in claim 1 wherein said projection is in the form of a frustrum.

3. The cutting insert improvement as claimed in claim 1 wherein said projection has a spherical surface.

4. The cutting insert improvement as claimed in claim 1 having an additional projection, said additional projection being situated within the extent of the concave groove, the two projections thus provided having dimensions different from each other.

5. The improved cutting insert as claimed in claim 1 wherein said body has a triangular structure, said structure having three cutting edges and three noses, two of said three cutting edges adjacent each of said three noses, said base chip breaker being formed along said three edges and on said three noses, the improvement further comprising a projection being provided on each of said three noses.

* * * * *